(12) United States Patent  
Hiroi

(10) Patent No.: US 12,124,001 B2  
(45) Date of Patent: Oct. 22, 2024

(54) FOG DETERMINATION APPARATUS, FOG DETERMINATION METHOD, AND COMPUTER READABLE MEDIUM

(71) Applicant: Mitsubishi Electric Corporation, Tokyo (JP)

(72) Inventor: Kimihiko Hiroi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1074 days.

(21) Appl. No.: 16/978,332

(22) PCT Filed: Mar. 12, 2018

(86) PCT No.: PCT/JP2018/009395  
§ 371 (c)(1),  
(2) Date: Sep. 4, 2020

(87) PCT Pub. No.: WO2019/175919  
PCT Pub. Date: Sep. 19, 2019

(65) Prior Publication Data  
US 2020/0408919 A1     Dec. 31, 2020

(51) Int. Cl.  
*G01W 1/00*     (2006.01)  
*G01S 17/04*     (2020.01)  
(Continued)

(52) U.S. Cl.  
CPC .............. *G01W 1/00* (2013.01); *G01S 17/04* (2020.01); *G01S 17/95* (2013.01); *G06V 10/507* (2022.01);  
(Continued)

(58) Field of Classification Search  
CPC ............ G01S 17/95; G01S 2013/9322; G01S 13/0218; G01S 13/95; G01S 15/885; G06V 20/56  
(Continued)

(56) References Cited

U.S. PATENT DOCUMENTS 7,414,706 B2 *   8/2008   Nichols ................. G01S 13/865  
356/28  
7,423,752 B2 *   9/2008   Leleve ................. B60Q 1/1423  
250/559.4  
(Continued)

FOREIGN PATENT DOCUMENTS

DE     102009028578 A1 *   2/2011   ............. G01S 17/42  
DE     102012209810 A1     12/2012  
(Continued)

OTHER PUBLICATIONS

Machine Translation of DE-102009028578-A1 (Year: 2011).*  
(Continued)

*Primary Examiner* — Yuqing Xiao  
*Assistant Examiner* — Benjamin Richard Hebert  
(74) *Attorney, Agent, or Firm* — Birch, Stewart, Kolasch & Birch, LLP

(57) ABSTRACT

A point data acquisition unit acquires a set of point data indicating reflection points obtained by an optical sensor that receives reflected light of an emitted light beam reflected at the reflection points. A fog determination unit projects an overhead view of the reflection points indicated by the point data included in the set acquired by the point data acquisition unit onto a plane in depth and horizontal directions. The fog determination unit makes a decision as to whether in this case the reflection points are distributed in an arcuate shape around the optical sensor. The fog determination unit determines the density of fog based on a result of the decision.

10 Claims, 20 Drawing Sheets

(51) Int. Cl.
*G01S 17/95* (2006.01)
*G06V 10/50* (2022.01)
*G06V 10/75* (2022.01)
*G06V 10/762* (2022.01)
*G06V 20/56* (2022.01)

(52) U.S. Cl.
CPC .......... *G06V 10/758* (2022.01); *G06V 10/763* (2022.01); *G06V 20/56* (2022.01)

(58) Field of Classification Search
USPC ....................................................... 356/4.01
See application file for complete search history.

(56) References Cited

U.S. PATENT DOCUMENTS

| | | | |
|---|---|---|---|
| 8,473,144 | B1 | 6/2013 | Dolgov et al. |
| 8,983,705 | B2 * | 3/2015 | Zhu .................. G01W 1/02 701/23 |
| 11,391,845 | B2 * | 7/2022 | Hiroi .................... G06V 10/141 |
| 2003/0222983 | A1 | 12/2003 | Nobori et al. |
| 2004/0054473 | A1 | 3/2004 | Shimomura |
| 2007/0031006 | A1 | 2/2007 | Leleve et al. |
| 2008/0007429 | A1 | 1/2008 | Kawasaki et al. |
| 2014/0067187 | A1 | 3/2014 | Ferguson et al. |
| 2014/0121880 | A1 | 5/2014 | Dolgov et al. |
| 2014/0233805 | A1 | 8/2014 | Faber et al. |
| 2014/0297094 | A1 | 10/2014 | Dolgov et al. |
| 2015/0061493 | A1 | 3/2015 | Jeromin et al. |
| 2016/0349358 | A1 | 12/2016 | Noda |
| 2018/0266876 | A1 * | 9/2018 | Carmon .................. G01H 9/00 |
| 2019/0179052 | A1 | 6/2019 | Zhu et al. |
| 2021/0019537 | A1 * | 1/2021 | Hiroi ...................... G01S 17/95 |

FOREIGN PATENT DOCUMENTS

| | | | |
|---|---|---|---|
| DE | 102015208149 | A1 * | 11/2016 |
| DE | 10 2015 112 103 | A1 | 1/2017 |
| EP | 3456597 | A2 | 3/2019 |
| JP | H07216545 | A * | 8/1995 |
| JP | 2000-329852 | A | 11/2000 |
| JP | 2004-56778 | A | 2/2004 |
| JP | 2004-112144 | A | 4/2004 |
| JP | 2008-33872 | A | 2/2008 |
| JP | 2009-42177 | A | 2/2009 |
| JP | 2009-177311 | A | 8/2009 |
| JP | 2010-15436 | A | 1/2010 |
| JP | 2010-97430 | A | 4/2010 |
| JP | 2013-192003 | A | 9/2013 |
| JP | 2014-89691 | A | 5/2014 |
| JP | 2016-223872 | A | 12/2016 |
| JP | 2017-97906 | A | 6/2017 |

OTHER PUBLICATIONS

"Monitor provides a virtual 360-degree scene of the car in bird's-eye view," Aug. 4, 2016, Nissan (Year: 2016).*

Pan, Ting et al., "Evaluation of Roundness Error Measured by Articulated Coordinate Measuring Machine," Feb. 4, 2013, IEEE, 2012 Second International Conference on Instrumentation & Measurement, Computer, Communication, and Control, pp. 276-279 (Year: 2013).*

Proof of prior public availability for the above document (Year: 2013).*

Roberts, Donna, "Variance and Standard Deviation," Dec. 2, 2016, MathBitsNotebook.com. (Year: 2016).*

Proof of prior public availability for the above document (Year: 2016).*

International Search Report (PCT/ISA/210) issued in PCT/JP2018/009395 mailed on May 22, 2018.

Chinese Office Action and Search Report for Chinese Application No. 201880090770.6, dated Nov. 2, 2021, with English translation of the Chinese Office Action.

German Office Action for German Application No. 112018007029.8, dated May 26, 2021, with English translation.

* cited by examiner

FOG DETERMINATION APPARATUS, FOG DETERMINATION METHOD, AND COMPUTER READABLE MEDIUM

TECHNICAL FIELD

The present invention relates to a technology to determine the density of fog.

BACKGROUND ART

Patent Literature 1 describes a technology to decide whether fog is present around a vehicle.

In Patent Literature 1, electromagnetic waves are transmitted to an area around the vehicle and reflection points are determined based on reflected waves of the electromagnetic waves. A plurality of determined reflection points with which the distance between the reflection points is within a certain range are classified as one segment. When the rate of second reflection points existing on scanning lines of electromagnetic waves passing through a first segment, which is a segment of first reflection points, is high, it is decided that the first segment is fog.

CITATION LIST

Patent Literature

Patent Literature 1: JP 2009-42177 A

SUMMARY OF INVENTION

Technical Problem

In the technology described in Patent Literature 1, when the density of fog is high, the number of electromagnetic waves that pass through the fog is small resulting in a low rate of second reflection points existing on scanning lines of electromagnetic waves passing through the first segment. Therefore, it is difficult to determine that fog is present.

It is an object of the present invention to appropriately determine the density of fog.

Solution to Problem

A fog determination apparatus according to the present invention includes
  a point data acquisition unit to acquire a set of point data indicating reflection points obtained by an optical sensor that receives reflected light of an emitted light beam reflected at the reflection points; and
  a fog determination unit to determine a density of fog based on whether the reflection points are distributed in an arcuate shape around the optical sensor when the reflection points indicated by the point data included in the set acquired by the point data acquisition unit are seen in an overhead view.

Advantageous Effects of Invention

In the present invention, the density of fog is determined based on whether reflection points are distributed in an arcuate shape around an optical sensor. The distribution state of reflection points around the optical sensor varies with the density of fog, so that the density of fog can be appropriately determined.

DESCRIPTION OF EMBODIMENTS

First Embodiment

Description of Configuration

Figure 1:
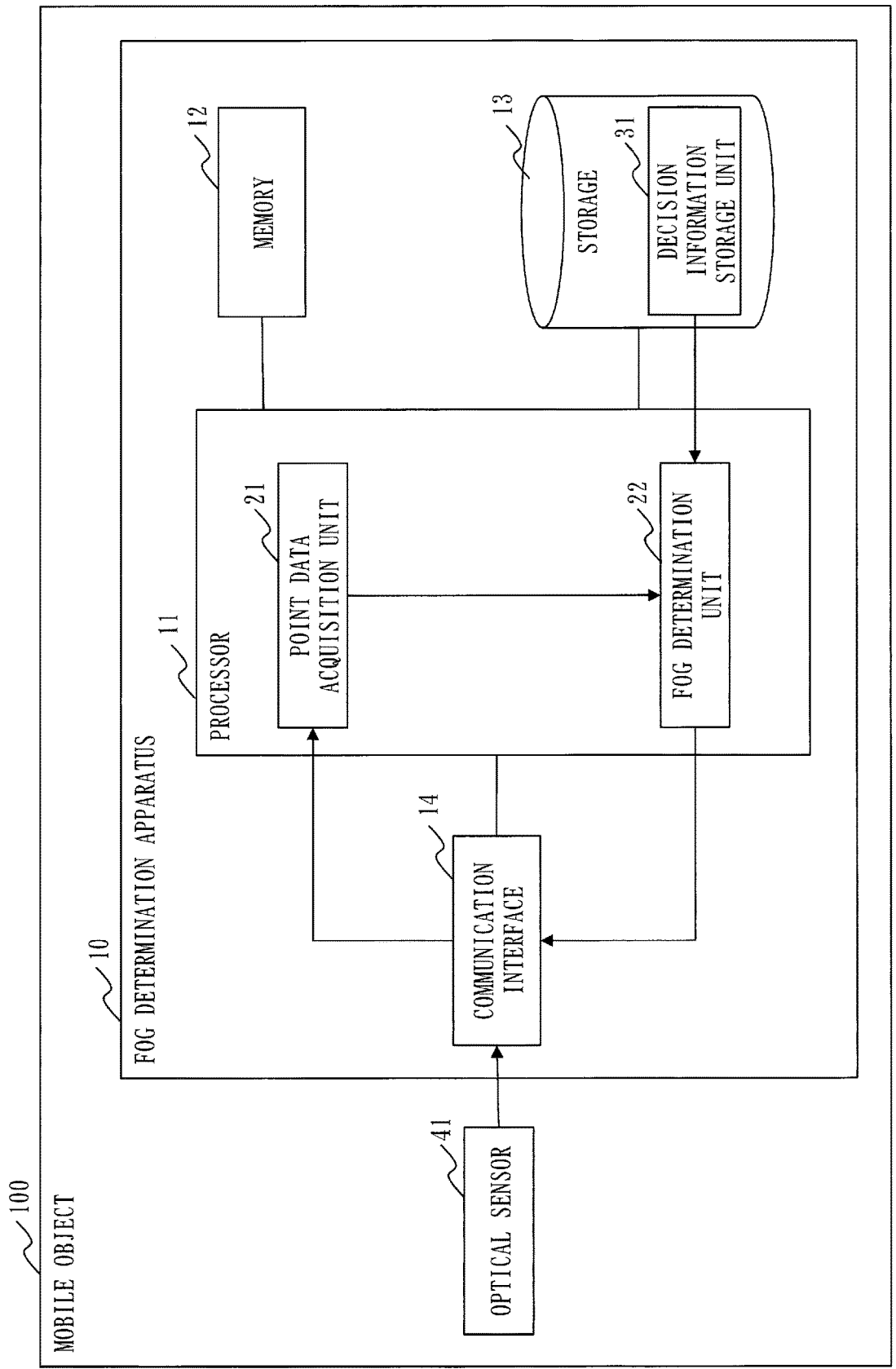
FIG. 1 is a configuration diagram of a fog determination apparatus 10 according to a first embodiment.

Referring to FIG. 1, a configuration of a fog determination apparatus 10 according to a first embodiment will be described.

The fog determination apparatus 10 is a computer, such as an electronic control unit (ECU), to be mounted on a mobile object 100.

In the first embodiment, the mobile object 100 is a vehicle. However, the mobile object 100 is not limited to the vehicle, and may be other types such as a ship or an airplane. The fog determination apparatus 10 may be implemented in a form integrated with or a form inseparable from the mobile object 100 or another component illustrated in the drawing, or may be implemented in a form detachable from or a form separable from the mobile object 100 or another component illustrated in the drawing.

The fog determination apparatus 10 includes hardware of a processor 11, a memory 12, a storage 13, and a communication interface 14. The processor 11 is connected with other hardware components via signal lines and controls the other hardware components.

The processor 11 is an integrated circuit (IC) that performs processing. Specific examples of the processor 11 are a central processing unit (CPU), a digital signal processor (DSP), and a graphics processing unit (GPU).

The memory 12 is a storage device to temporarily store data. Specific examples of the memory 12 are a static random access memory (SRAM) and a dynamic random access memory (DRAM).

The storage 13 is a storage device to store data. A specific example of the storage 13 is a hard disk drive (HDD). Alternatively, the storage 13 may be a portable recording medium, such as a Secure Digital (SD, registered trademark) memory card, CompactFlash (CF, registered trademark), a NAND flash, a flexible disk, an optical disc, a compact disc, a Blu-ray (registered trademark) disc, or a digital versatile disc (DVD).

The communication interface 14 is an interface for communication with external devices. Specific examples of the communication interface 14 are an Ethernet (registered trademark) port, a Universal Serial Bus (USB) port, and a High-Definition Multimedia Interface (HDMI, registered trademark) port.

The communication interface 14 is connected with an optical sensor 41 mounted on the mobile object 100. The optical sensor 41 is a device that emits a light beam, which is a beam of light, and receives reflected light of the emitted light beam reflected at a reflection point. A specific example of the optical sensor 41 is a LiDAR (Light Detection and Ranging).

The fog determination apparatus 10 includes, as functional components, a point data acquisition unit 21 and a fog determination unit 22. The functions of the functional components of the fog determination apparatus 10 are realized by software.

The storage 13 stores programs for realizing the functions of the functional components of the fog determination apparatus 10. These programs are loaded into the memory 12 by the processor 11 and executed b the processor 11. This realizes the functions of the functional components of the fog determination apparatus 10.

The storage 13 realizes the function of a decision information storage unit 31.

FIG. 1 illustrates only one processor 11. However, a plurality of processors 11 may be included, and the plurality of processors 11 may cooperate to execute the programs for realizing the functions.

Description of Operation

Referring to FIGS. 2 to 5, operation of the fog determination apparatus 10 according to the first embodiment will be described.

The operation of the fog determination apparatus 10 according to the first embodiment corresponds to a fog determination method according to the first embodiment. The operation of the fog determination apparatus 10 according to the frit embodiment also corresponds to processes of a fog determination program according to the first embodiment.

Figure 2:
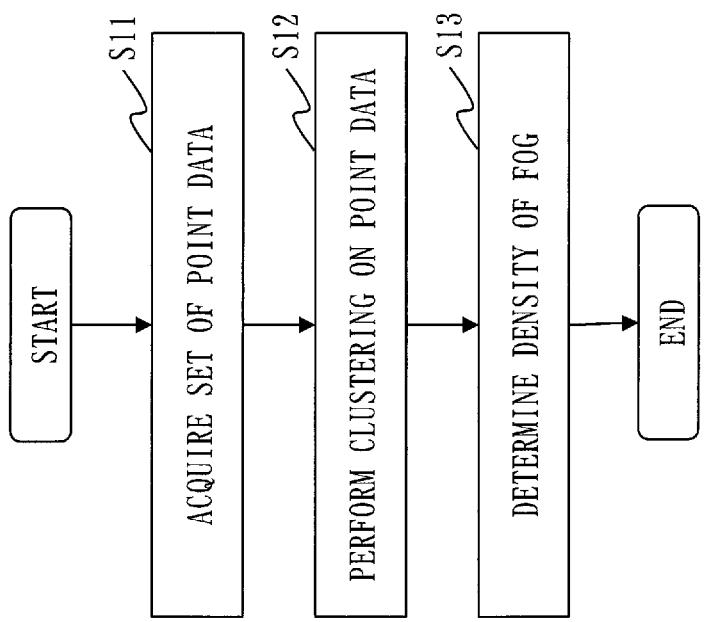
FIG. 2 is a flowchart illustrating overall operation of the fog determination apparatus 10 according to the first embodiment.

Referring to FIG. 2, the overall operation of the fog determination apparatus 10 according to the first embodiment will be described.

(Step S11: Point Data Acquisition Process)

The point data acquisition unit 21 acquires, via the communication interface 14, a set of point data indicating reflection points obtained by the optical sensor 41 that receives reflected light of an emitted light beam reflected at the reflection points.

Point data is a pair of first point data indicating a first reflection point, which is a reflection point of a given light beam emitted by the optical sensor 41, and second point data indicating a second reflection point, which is a reflection point at which the intensity of reflected light of the given light beam is lower than that at the first reflection point. In the first embodiment, the first reflection point is a reflection point with the highest intensity of reflected light, and the second reflection point is a reflection point with the second highest intensity of reflected light after the first reflection point.

Figure 3:
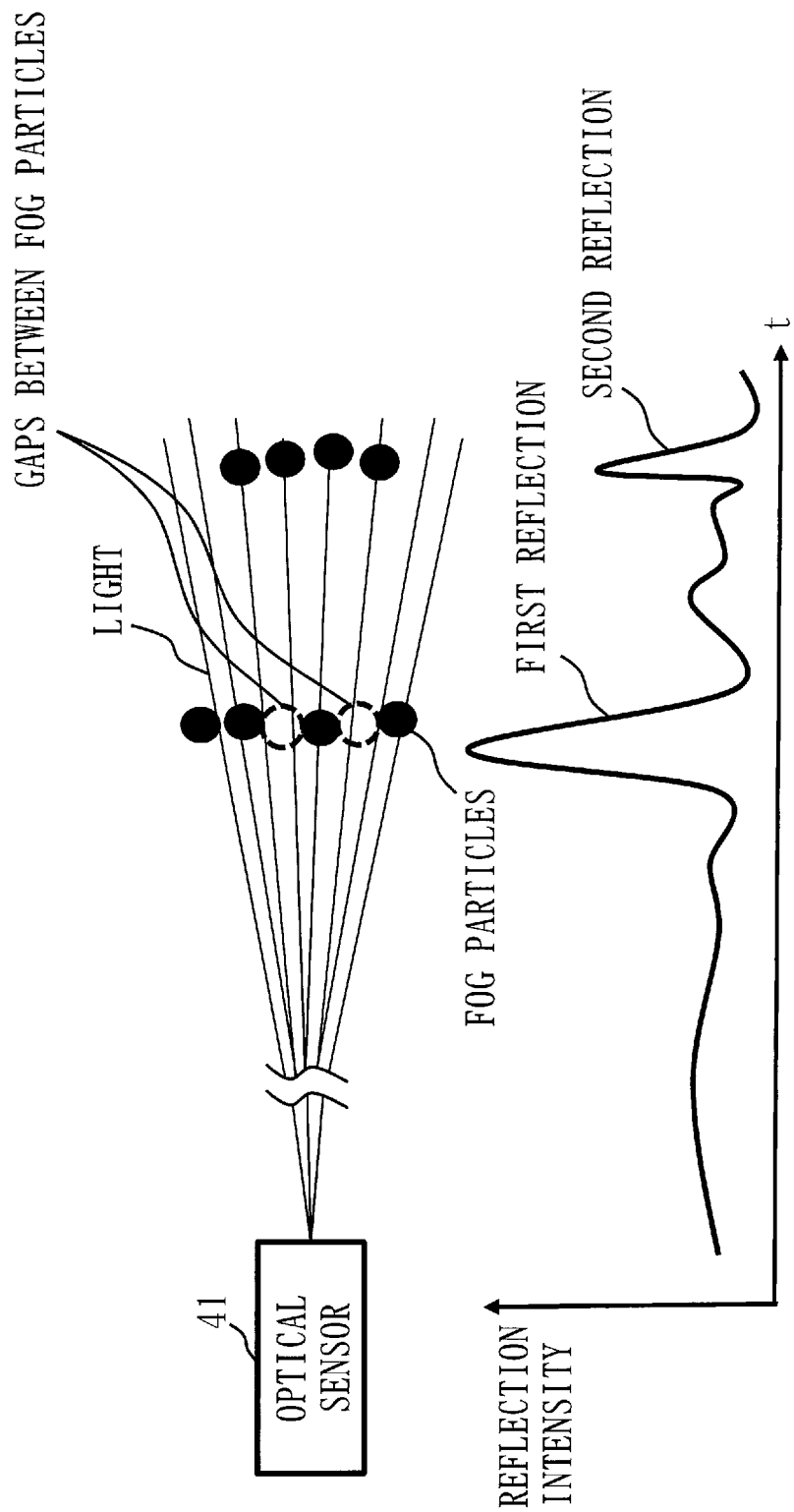
FIG. 3 is a diagram describing point data according to the first embodiment.

As illustrated in FIG. 3, the optical sensor 41 emits a light beam, which is a beam of light. When fog is present, the light forming the light beam is first reflected by some fog particles that are scattered sparsely in vertical and depth directions. In most cases, the reflected light of reflection at a position near the optical sensor 41 has the highest intensity. Therefore, a reflection point at which reflection has occurred at a position near the optical sensor 41 becomes the first reflection point. The light that has passed through the fog particles and the light reflected by the fog particles are reflected by other fog particles or an obstacle such as a vehicle around the mobile object 100. In most cases, the reflected light of this reflection has the second highest intensity, so that a reflection point at which this reflection has occurred becomes the second reflection point.

(Step 412: Clustering Process)

The point data acquisition unit 21 performs clustering on the point data included in the set acquired in step S11.

Specifically, the point data acquisition unit 21 performs clustering on the point data included in the set based on the position of at least one of the first reflection point and the second reflection point so as to generate one or more clusters. As a method for clustering the point data, an existing cluster technique may be used. For example, the point data acquisition unit 21 groups pieces of point data with which the distance between the positions of the respective first reflection points is within a certain distance into one cluster.

In this description, the point data acquisition unit 21 performs clustering. However, the point data acquisition unit 21 may acquire a set of point'data on which clustering has been performed. That is, clustering of point data may be performed in an ECU for clustering that is separate from the fog determination apparatus 10, and the point data acquisition unit 21 may acquire a set of point data on which clustering has been performed in the ECU for clustering.

(Step S13: Fog Determination Process)

The fog determination unit 22 determines the density of fog based on a distribution of the distance between the first reflection point and the second reflection point concerning the point data included in the set acquired in step S11. The fog determination unit 22 here determines the density of fog based on a distribution of the distance between the first reflection point and the second reflection point concerning the point data clustered into one cluster in step S12.

Specifically, the fog determination unit 22 determines the density of fog by comparing a distribution pattern of the distance corresponding to each density of fog with the distribution of the distance concerning the point data included in the set. In the first embodiment, the fog determination unit 22 determines the density of fog by comparing a histogram pattern of frequencies of the distance corresponding to each density of fog with a histogram of frequencies of the distance concerning the point data included in the set.

Figure 4:
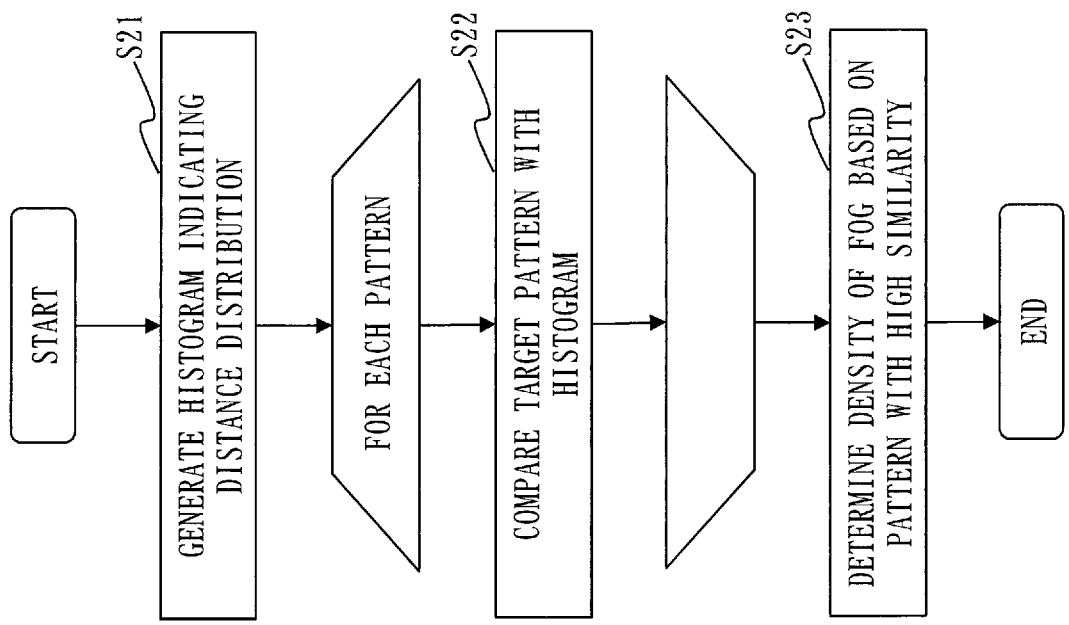
FIG. 4 is a flowchart of a fog determination process according to the first embodiment.
Figure 5:
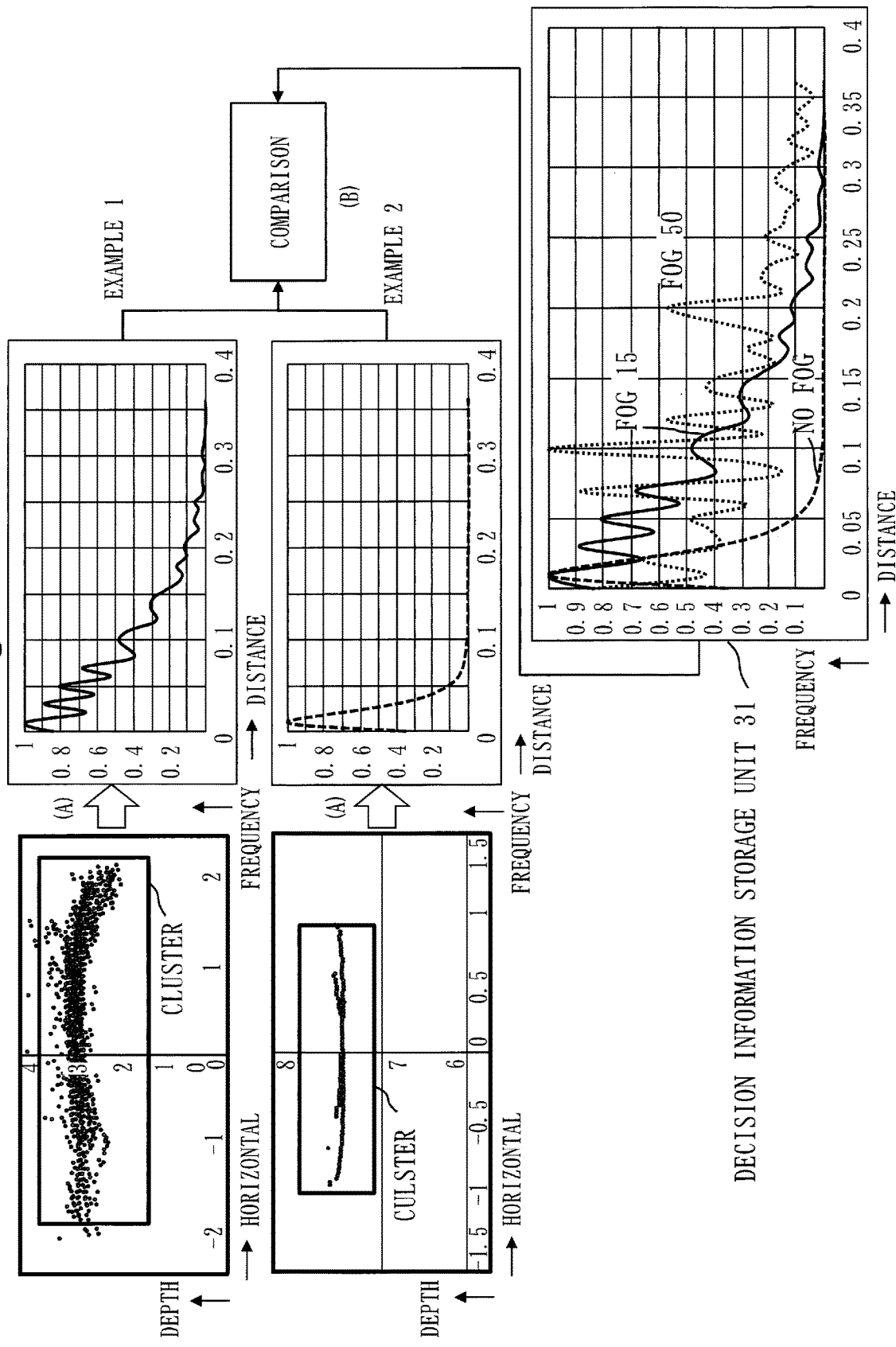
FIG. 5 is a diagram describing the fog determination process according to the first embodiment.

Referring to FIGS. 4 and 5, a fog determination process according to the first embodiment (step S13 in FIG. 2) will be described.

(Step S21: Histogram Generation Process)

As illustrated in (A) of FIG. 5, the fog determination unit 22 generates a histogram representing a distribution of the distance between the first reflection point and the second reflection point concerning the point data clustered into one cluster in step S12.

Specifically, the fog determination unit 22 determines the number of pieces of point data for each length of the distance, and divides each determined number of pieces of point data by the number of pieces of point data included in the cluster so as to calculate a frequency for each length of the distance. The fog determination unit 22 generates a histogram indicating the calculated frequencies.

In the first embodiment, the decision information storage unit 31 stores distribution patterns of the distance between the first reflection point and the second reflection point for each density of fog. Specifically, the decision information storage unit 31 stores histograms of frequencies of the distance between the first reflection point and the second reflection point for each density of fog.

The process of step S22 is performed using each of the histogram patterns stored in the decision information storage unit 31 as a target pattern.

(Step S22: Comparison Process)

As illustrated in (B) of FIG. 5, the fog determination lit 22 compares the target pattern with the histogram generated in step S21 to determine the density of fog.

Specifically, the fog determination unit 22 retrieves the target pattern from the decision information storage unit 31. The fog determination unit 22 compares the retrieved target pattern with the histogram generated in step S21. As a method for comparison, an existing similarity comparison technique may be used. In the first embodiment, the fog determination unit 22 treats bins of a histogram as vectors, and calculates a similarity between vectors of the retrieved pattern and vectors of the histogram generated in step S21 based on the Euclidean distance or histogram intersection. This is not limiting, and the fog determination unit 22 may perform comparison using techniques such as a support-vector machine (SVM), AdaBoost, and supervised learning of a multilayer perception.

(Step S23: Density Determination Process)

The fog determination unit 22 determines a pattern with which the highest similarity is calculated in step S22, out of the histogram patterns stored in the decision information storage unit 31. The fog determination unit 22 determines that the density of fog corresponding to the determined pattern is the density of fog mound the mobile object 100.

In Example 1 of FIG. 5, the histogram generated in step S21 is highly similar to a pattern of fog with a visibility of 15 m (denoted as fog 15 in FIG. 5). Therefore, it is determined in Example 1 that fog with a visibility of 15 m is present. In Example 2 in FIG. 5, the histogram generated in step S21 is highly similar to a pattern of no fog. Therefore, it is determined in Example 2 that no fog is present.

Note that determining the density of fog is not limited to determining a level of density out of a plurality of levels of density of fog, but also includes determining whether fog with a density greater than or equal to a certain level is present. That is, determining the density of fog includes deciding whether fog is present.

Effects of First Embodiment

As described above, the fog determination apparatus 10 according to the first embodiment determines the density of fog based on the distribution of the distance between the first reflection point and the second reflection point. The distribution of the distance between the first reflection point and the second reflection point varies with the density of fog, so that the density of fog can be appropriately determined.

<First Variation>

In the first embodiment, the functional components are realized by software.

As a first variation, however, the functional components may be realized by hardware. With regard to this first variation, differences from the first embodiment will be described.

Figure 6:
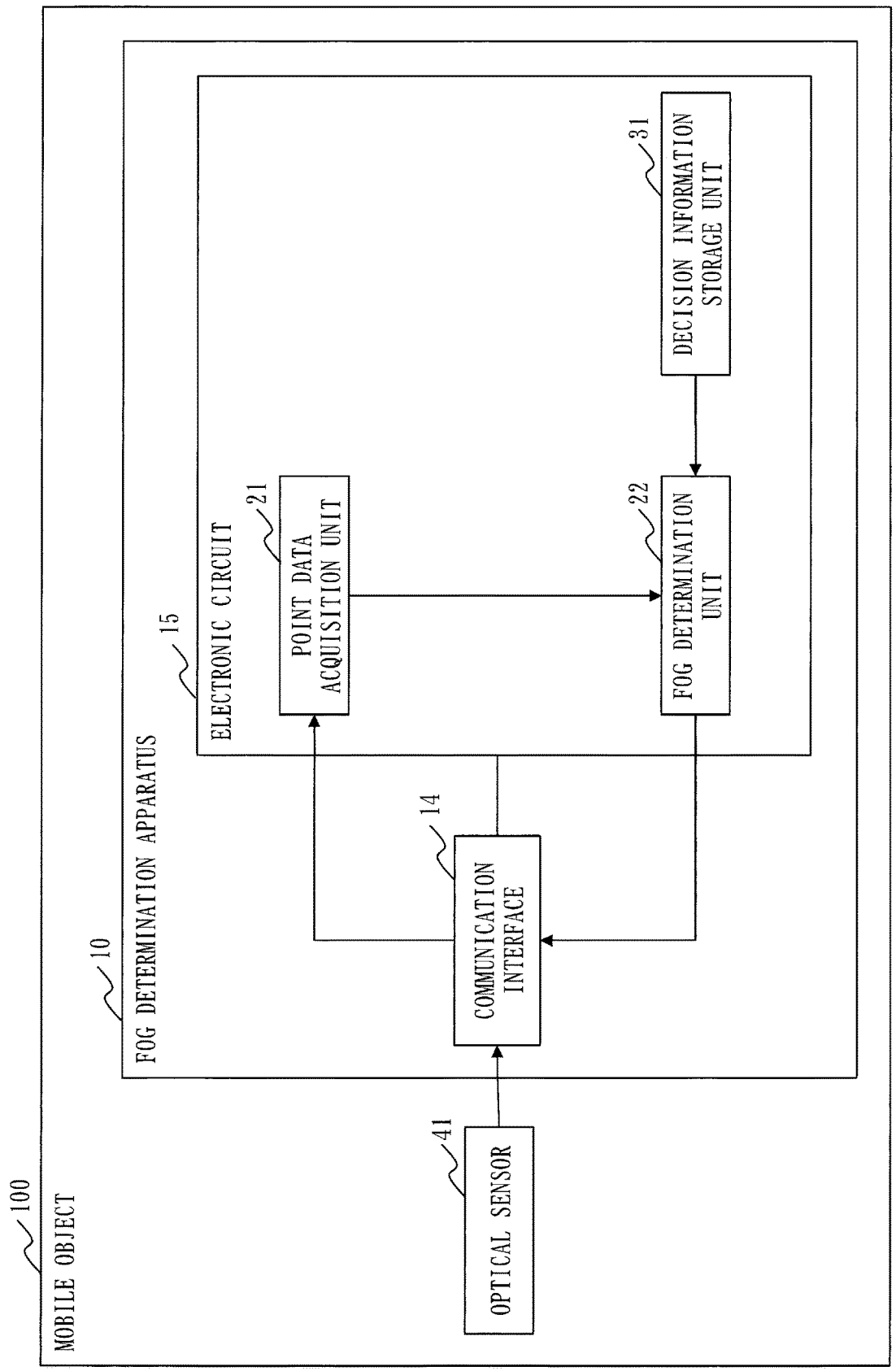
FIG. 6 is a configuration diagram of the fog determination apparatus 10 according to a first variation.

Referring to FIG. 6, a configuration of the fog determination apparatus 10 according to the first variation will be described.

When the functional components are realized by hardware, the fog determination apparatus 10 includes an electronic circuit 15, in place of the processor 11, the memory 12, and the storage 13. The electronic circuit 15 is a dedicated circuit that realizes the functions of the functional components, the memory 12, and the storage 13.

The electronic circuit 15 is assumed to be a single circuit, a composite circuit, a programmed processor, a parallel-programed processor, a logic IC, a gate array (GA), an application specific integrated circuit (ASIC), or a field-programmable gate array (FPGA).

The functional components may be realized by one electronic circuit 15, or the functional components may be distributed among and realized by a plurality of electronic circuits 15.

<Second Variation>

As a second variation, some of the functional components may be realized by hardware, and the rest of the functional components may be realized by software.

Each of the processor 11, the memory 12, the storage 13, and the electronic circuit 15 is referred to as processing circuitry. That is, the functions of the functional components are realized by the processing circuitry.

<Third Variation>

In the first embodiment, the fog determination apparatus 10 is realized by one computer such as an ECU. However, the fog determination apparatus 10 may be realized by a plurality of computers such as ECUs.

Second Embodiment

A second embodiment differs from the first embodiment in that the density of fog is determined based on whether reflection points are distributed in an arcuate shape around the optical sensor 41. In the second embodiment, this difference will be described, and description of the same portions will be omitted.

Description of Operation

Referring to FIGS. 7 to 10, operation of the fog determination apparatus 10 according to the second embodiment will be described.

The operation of the fog determination apparatus 10 according to the second embodiment corresponds to a fog determination method according to the second embodiment. The operation of the fog determination apparatus 10 according to the second embodiment also corresponds to processes of a fog determination program according to the second embodiment.

Figure 7:
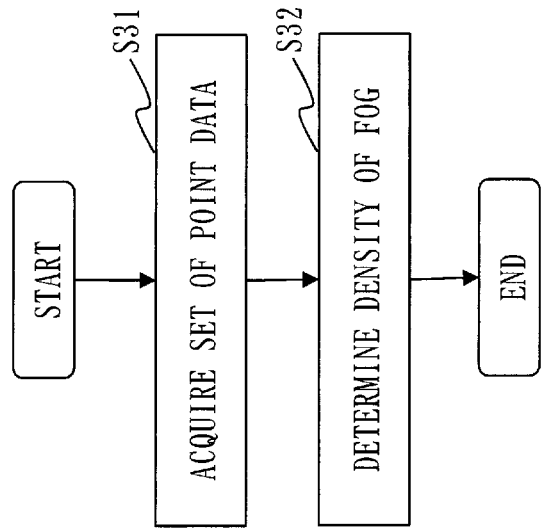
FIG. 7 is a flowchart illustrating overall operation of the fog determination apparatus 10 according to a second embodiment.

Referring to FIG. 7, the overall operation of the fog determination a apparatus 10 according to the second embodiment will be described.

(Step S31: Point Data Acquisition Process)

The point data acquisition unit 21 acquires a set of point data indicating reflection points obtained by the optical sensor 41 that receives reflected light of an emitted light beam reflected at the reflection points.

In the second embodiment, unlike in the first embodiment, point data need not be a pair of first point data and second point data. In the second embodiment, point data may indicate only one reflection point.

(Step S32: Fog Determination Process)

The fog determination unit 22 determines the density of fog based on whether the reflection points are distributed in an arcuate shape around the optical sensor 41 when the reflection points indicated by the point data included in the set acquired in step S31 are seen in an overhead view.

Figure 8:
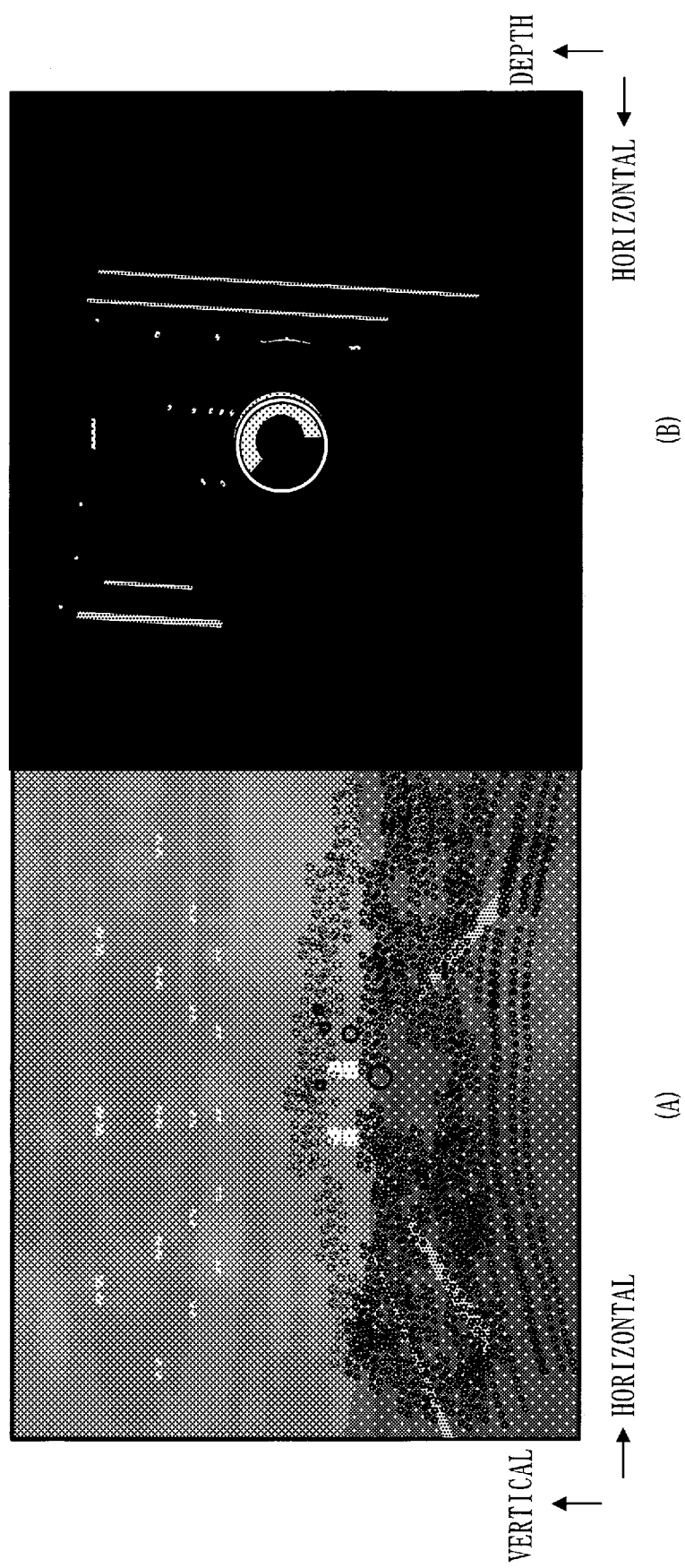
FIG. 8 is a diagram describing point data when fog is present according to the second embodiment.

That is, the fog determination unit 22 transforms the set of point data indicating the reflection points illustrated in (A) of FIG. 8 into an overhead view as illustrated in (B) of FIG. 8. That is, the fog determination unit 22 projects the reflection points indicated by the set of point data onto a coordinate system in depth and horizontal directions. When fog is present, the light beam is reflected uniformly around the optical sensor 41, so that the reflection points are distributed in an arcuate shape around the optical sensor 41. Note that, in (B) of FIG. 8, the reflection points are distributed not in a circular shape but in an arcuate shape. This is because there are no reflection points at the position where the mobile object 100 is located.

Figure 9:
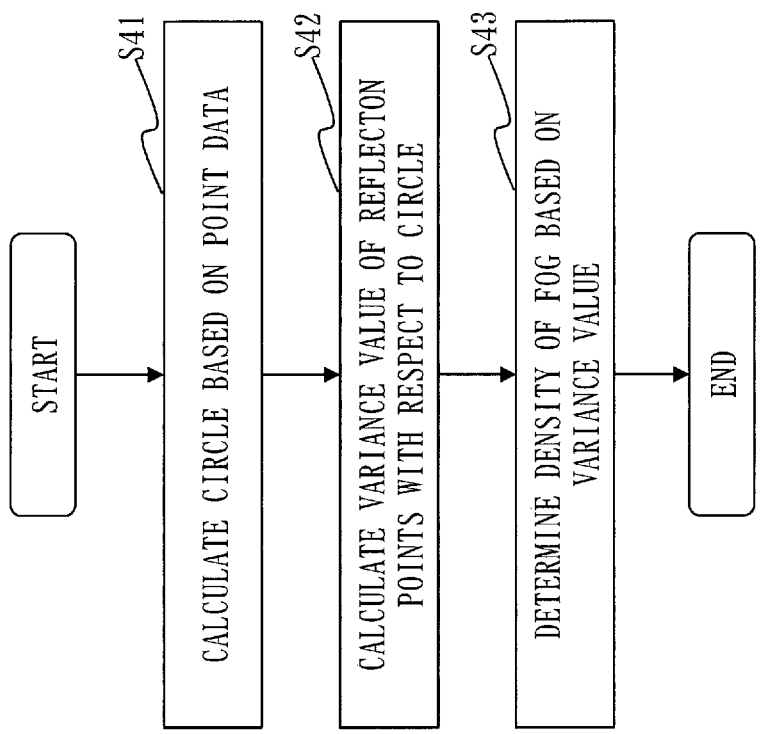
FIG. 9 is a flowchart of a fog determination process according to the second embodiment.

Referring to FIG. 9, a fog determination process according to the second embodiment (step S32 in FIG. 7) will be described.

(Step S41: Circle Approximation Process)

The fog determination unit 22 calculates a circle approximated by the least-squares method of the circle, using as inputs depth and horizontal coordinates of the reflection points indicated by the point data included in the set acquired in step S31.

Specifically, the fog determination unit 22 inputs depth and horizontal coordinates $(x_i, y_i)$ of a reflection point indicated by point data i (i=1 . . . , n) included in the set into the least-squares equations of the circle indicated in Formula 1 to calculate center coordinates (A, B) and a radius C of the circle to be approximated.

$$\begin{pmatrix} \sum x_i^2 & \sum x_i y_i & \sum x_i \\ \sum x_i y_i & \sum y_i^2 & \sum y_i \\ \sum x_i & \sum y_i & \sum 1 \end{pmatrix} \begin{pmatrix} A \\ B \\ C \end{pmatrix} = \begin{pmatrix} -\sum(x_i^3 + x_i y_i^2) \\ -\sum(x_i^2 y + y_i^3) \\ -\sum(x_i^2 + y_i^2) \end{pmatrix}$$ [Formula 1]

$$\begin{pmatrix} A \\ B \\ C \end{pmatrix} = \begin{pmatrix} \sum x_i^2 & \sum x_i y_i & \sum x_i \\ \sum x_i y_i & \sum y_i^2 & \sum y_i \\ \sum x_i & \sum y_i & \sum 1 \end{pmatrix}^{-1} \begin{pmatrix} -\sum(x_i^3 + x_i y_i^2) \\ -\sum(x_i^2 y + y_i^3) \\ -\sum(x_i^2 + y_i^2) \end{pmatrix}$$

(Step S42: Variance Calculation Process)

Figure 10:
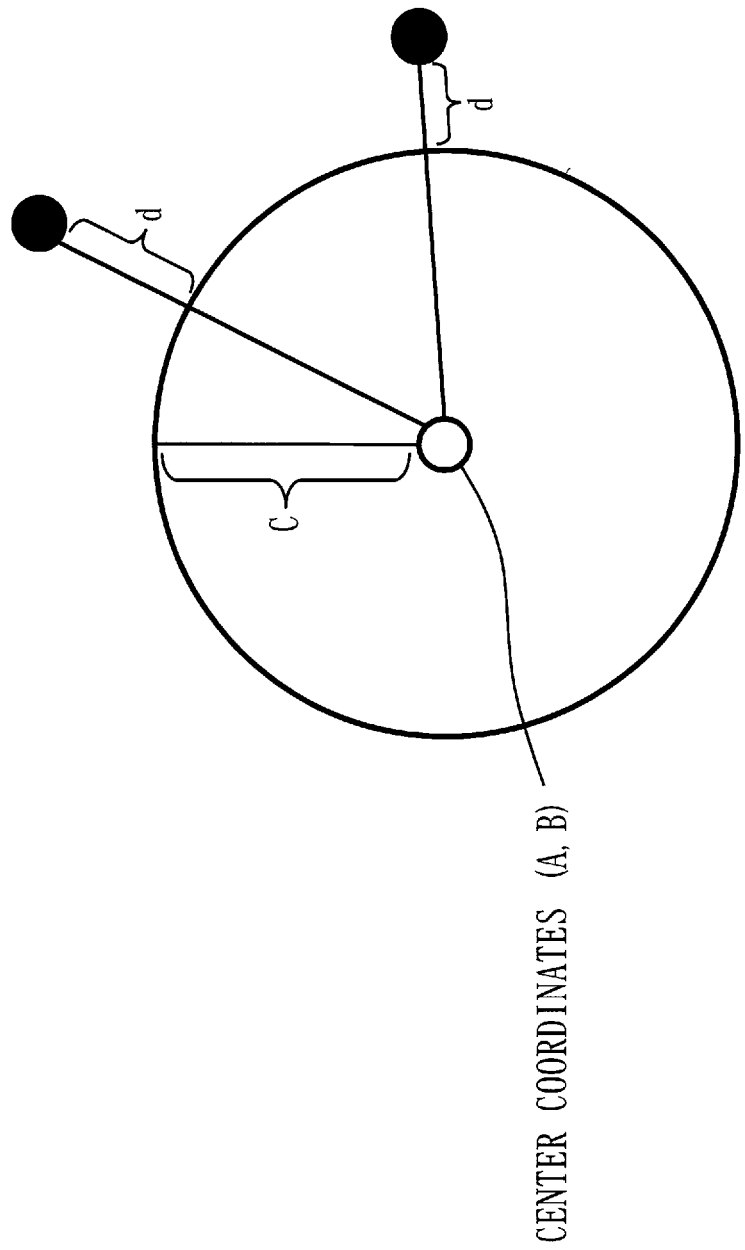
FIG. 10 is a diagram describing a variance calculation process according to the second embodiment.

The fog determination unit 22 treats each piece of point data included in the set acquired in step S31 as target point data, and calculates a distance d from the reflection point indicated by the target point data to the circle calculated in step S41. That is, as illustrated in FIG. 10, the fog determination unit 22 calculates, as the distance d, the length from the reflection point to the circle on a straight line that is drawn from the reflection point indicated by the target point data and is perpendicular to the tangent of the circle. Then, the fog determination unit 22 calculates a variance value of the distance d.

(Step S43: Density Determination Process)

The fog determination unit 22 determines the density of fog based on the variance value calculated in step S42. The fog determination unit 22 determines a higher density of fog as the variance value is smaller.

In the second embodiment, the decision information storage unit 31 stores threshold values of the variance value for each density of fog. The fog determination unit 22 determines the density of fog by comparing the variance value calculated in step S42 with the threshold values for each density of fog stored in the decision information storage unit 31.

Effects of Second Embodiment

As described above, the fog determination apparatus 10 according to the second embodiment determines the density of fog based on whether reflection points are distributed in an arcuate shape around the optical sensor 41. When fog is present, reflection points are distributed in an arcuate shape around the optical sensor 41. Therefore, it is possible to appropriately determine whether fog is present.

The fog determination apparatus 10 according to the second embodiment determines the density of fog based on the variance value of the distance d from each of the reflection points to the circle. The variance value varies with the density of fog, so that the density of fog can be appropriately determined.

Third Embodiment

A third embodiment differs from the first and second embodiments in that the density of fog is determined by a combination of the method for determining the density of fog described in the first embodiment and the method for determining the density of fog described in the second embodiment. In the third embodiment, this difference will be described, and description of the same portions will be omitted.

Description of Configuration

Figure 11:
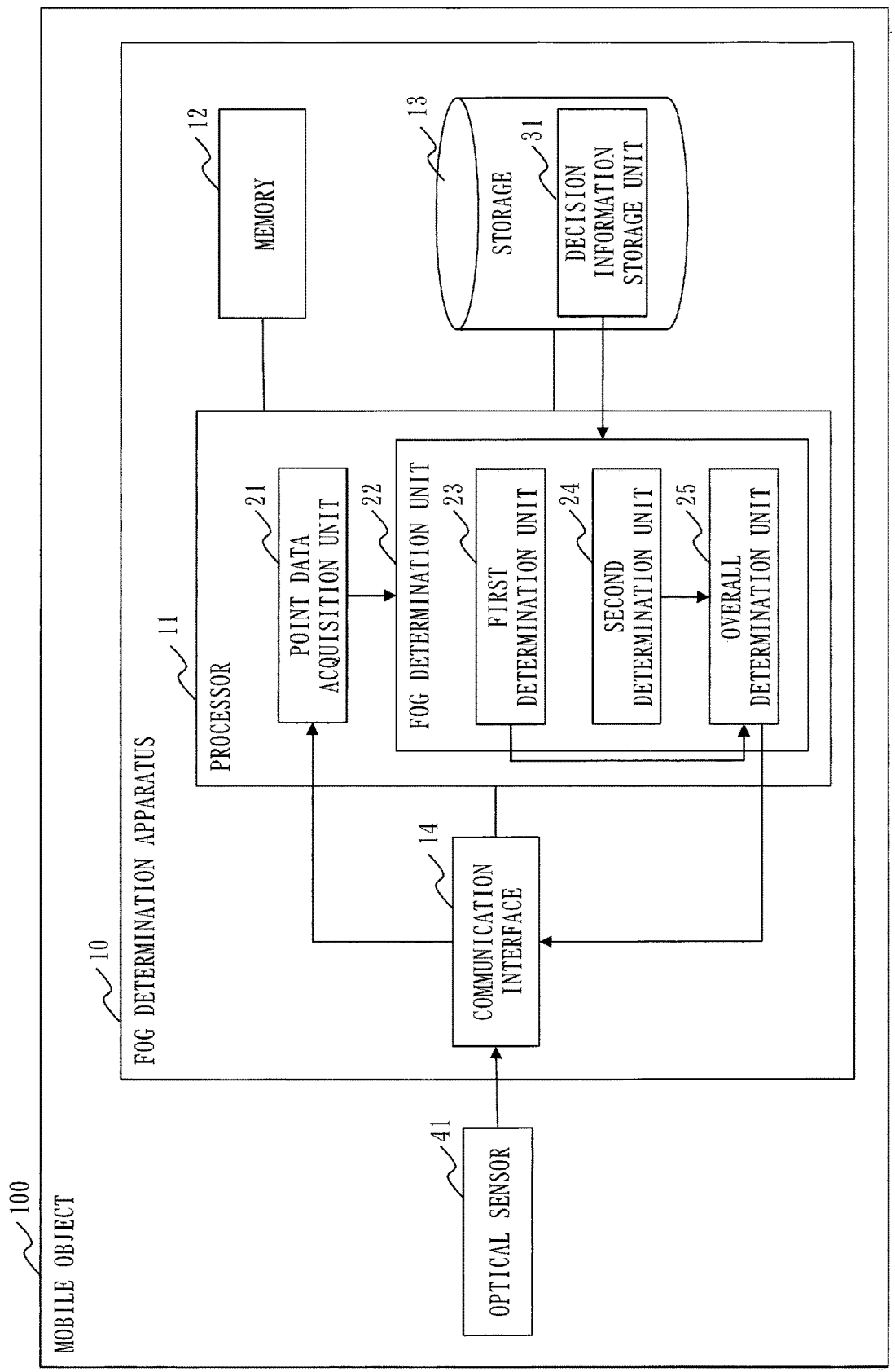
FIG. 11 is a configuration diagram of the fog determination apparatus 10 according to a third embodiment.

Referring to FIG. 11, a configuration of the fog determination apparatus 10 according to the third embodiment will be described.

The fog determination apparatus 10 differs from those in the first and second embodiments in that the fog determination unit 22 includes a first determination unit 23, a second determination unit 24 and an overall determination unit 25.

Description of Operation

Figure 12:
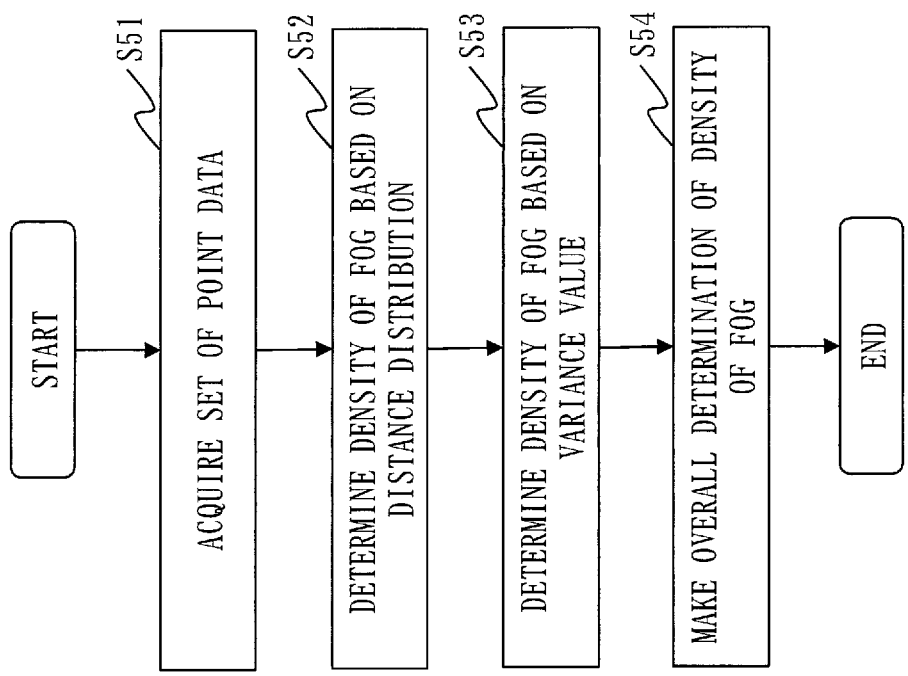
FIG. 12 is a flowchart illustrating overall operation of the fog determination apparatus 10 according to the third embodiment.

Referring to FIG. 12, operation of the fog determination apparatus 10 according to the third embodiment will be described.

The operation of the fog determination apparatus 10 according to the third embodiment corresponds to a fog determination method according to the third embodiment. The operation of the fog determination apparatus 10 according to the third embodiment also corresponds to processes of a fog determination program according to the third embodiment.

(Step S51: Point Data Acquisition Process)

The point data acquisition unit 21 acquires a set of point data.

In the third embodiment, point data is a pair of first point data and second point data.

(Step S52: First Determination Process)

The first determination unit 23 determines the density of fog as a first density based on a distribution of the distance between the first reflection point and the second reflection point. That is, the first determination unit 23 determines the density of fog by the method described in the first embodiment.

(Step S53: Second Determination Process)

The second determination unit 24 calculates a circle approximated by the reflection points when the reflection points indicated by the point data included in the set are seen in an overhead view, and determines the density of fog as a second density based on a variance of the distance between the calculated circle and each of the reflection points. That is, the second determination unit 24 determines the density of fog by the method described in the second embodiment.

At this time, the second determination unit 24 may use only the first point data included in the point data, or may use both the first point data and the second point data.

(Step S54: Overall Determination Process)

The overall determination unit 25 determines the density of fog based on the first density determined in step S52 and the second density determined in step S53.

For example, assume that each of the first density and the second density has determined that fog is present or no fog is present. In this case, the overall determination unit 25 determines that fog is present if both the first density and the second density indicate that fog is present, and determines that no fog is present in other cases.

For example, assume that each of the first density and the second density has determined a level of density of fog out of a plurality of levels. In this case, the overall determination unit 25 determines the density of fog by comparing the sum of a weighted value of the first density and a weighted value of the second density with a threshold value set for each level of density of fog. That is, the overall determination unit 25 determines the density of fog by comparing $\theta 1X+\theta 2Y$ with a threshold value the set for each level of density, where the first density is X, the second density is Y, the weight of the first density is $\theta 1$, and the weight of the second density is $\theta 2$.

Effects of Third Embodiment

As described above, the fog determination apparatus 10 according to the third embodiment determines the density of fog by a combination of the methods described in the first and second embodiments. This allows the density of fog to be determined with high accuracy.

Fourth Embodiment

A fourth embodiment differs from the first to third embodiments in that a sensor threshold value of a sensor for identifying an obstacle is set depending on the density of fog that has been determined. In the fourth embodiment, this difference will be described, and description of the same portions will be omitted.

Description of Configuration

Figure 13:
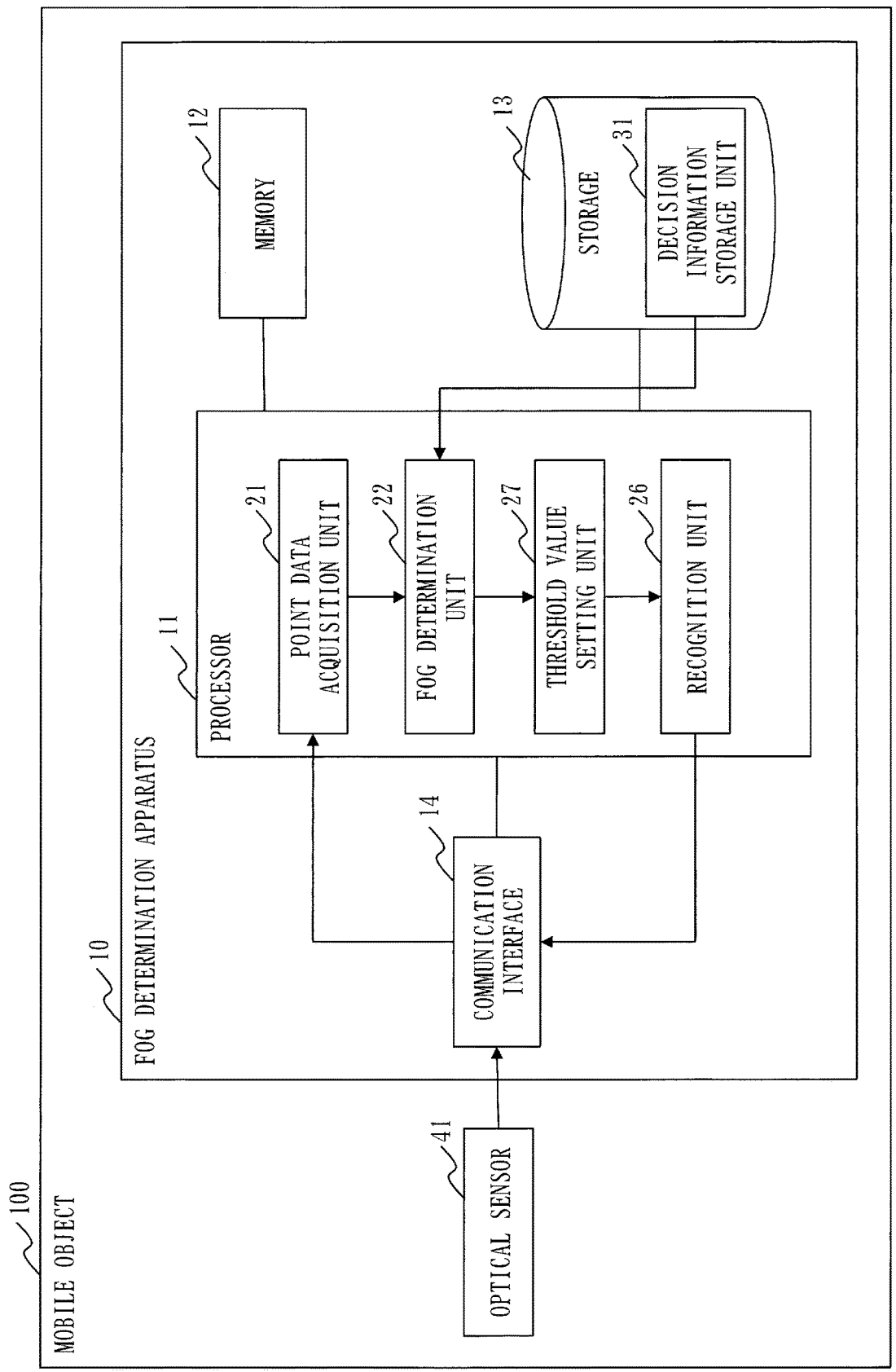
FIG. 13 is a configuration diagram of the fog determination apparatus 10 according to a fourth embodiment.

Referring to FIG. 13, a configuration of the fog determination apparatus 10 according to the fourth embodiment will be described.

The fog determination apparatus 10 differs from those in the first to third embodiments in that a recognition unit 26 and a threshold value setting unit 27 are included.

Description of Operation

Figure 14:
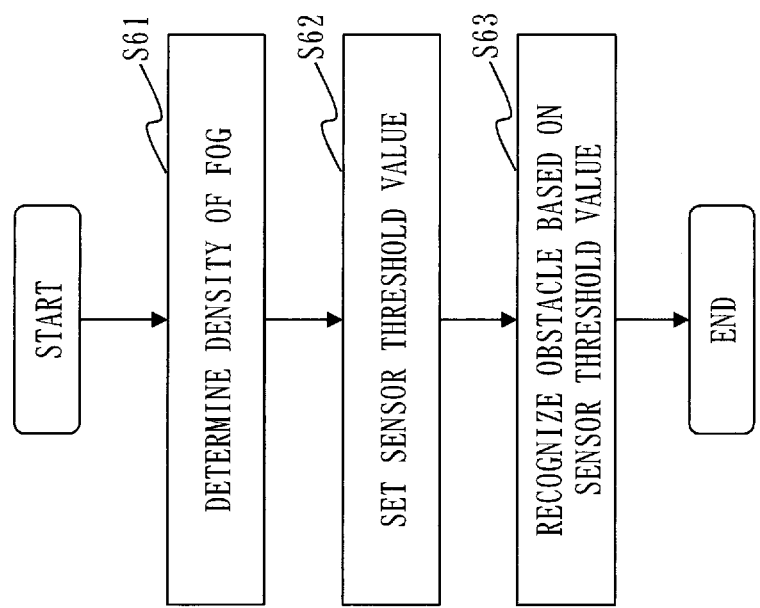
FIG. 14 is a flowchart illustrating overall operation of the fog determination apparatus 10 according to the fourth embodiment.
Figure 15:
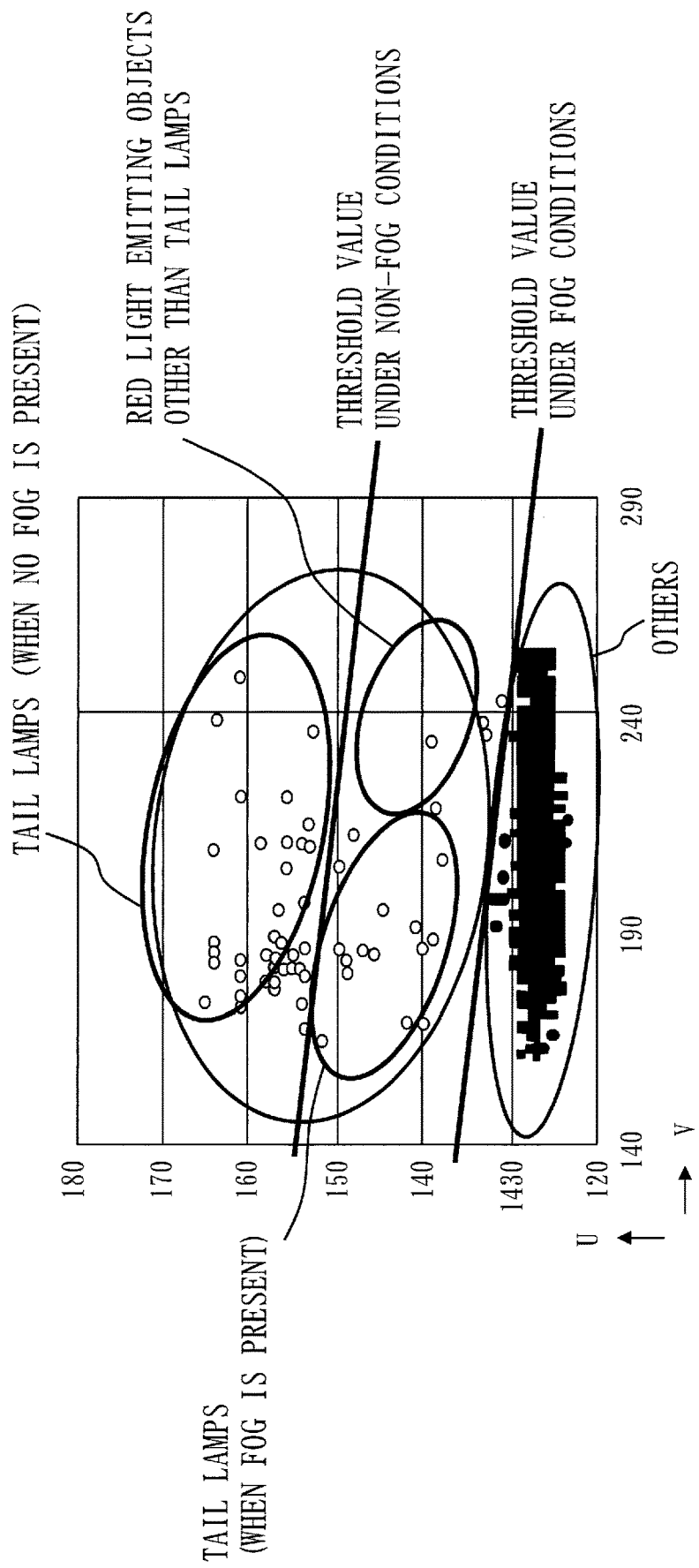
FIG. 15 is a diagram describing a threshold value setting process according to the fourth embodiment.

Referring to FIGS. 14 and 15, operation of the fog determination apparatus 10 according to the fourth embodiment will be described.

The operation of the fog determination apparatus 10 according to the fourth embodiment corresponds to a fog determination method according to the fourth embodiment. The operation of the fog determination apparatus 10 according to the fourth embodiment also corresponds to processes of a fog determination program according to the fourth embodiment.

Referring to FIG. 14, the overall operation of the fog determination apparatus 10 according to the fourth embodiment will be described.

Step S61 is the process to determine the density of fog described in the first to third embodiments.

(Step S62: Threshold Value Setting Process)

The threshold value setting unit 27 sets the sensor threshold value of the sensor for identifying an obstacle depending on the density of fog determined in step S61.

Referring to FIG. 15, a specific example will be described.

FIG. 15 illustrates a case in which a camera is used as the sensor and tail lamps of a vehicle are identified.

When tail lamps are identified using the camera, a boundary line that linearly distinguishes tail lamps and others is used as the sensor threshold value on a UV plane of YUV data. Thus, the threshold value setting unit 27 sets this boundary line depending on the density of fog. The boundary line can be expressed as $V=a \cdot U+b$. Thus, the threshold value setting unit 27 sets the values of a and b depending on the density of fog.

As illustrated in FIG. 15, when no fog is present, the threshold value setting unit 27 sets the boundary line, which is the sensor threshold value, to a higher value in order to prevent red light emitting objects other than tail lamps from being mistakenly recognized as tail lamps. When fog is present, the threshold value setting unit 27 sets the boundary line, which is the sensor threshold value, to a lower value in order to facilitate recognition of red light emitting objects as tail lamps.

Note that FIG. 15 illustrates an example of setting the sensor threshold value for two cases, one in which fog is present and one in which no fog is present. However, the threshold value setting unit 27 may set the sensor threshold value for each of a plurality of levels of density of fog. In this case, the boundary line, which is the sensor threshold value, is set to a lower value as the density of fog is greater.

(Step S63: Recognition Process)

The recognition unit 26 recognizes an obstacle, using tire sensor threshold value set in step S62.

In the example in FIG. 15, the recognition unit 26 detects tail lamps in the image data obtained by the camera, using the boundary line set in step S62.

Effects of Fourth Embodiment

As described above, the fog determination apparatus 10 according to the fourth embodiment sets the sensor threshold value depending on the density of fog. This allows an obstacle to be appropriately recognized.

Fifth Embodiment

A fifth embodiment differs from the first to fourth embodiments in that a sensor to be used for identifying an obstacle is decided depending on the density of fog. In the fifth embodiment, this difference will be described, and description of the same portions will be omitted.

Note that an example in which a function is added to the first to third embodiments will be described here. However, the function may also be added to the fourth embodiment.
Description of Configuration Referring to FIG. 16, a configuration of the fog determination apparatus 10 according to the fifth embodiment will be described.

The fog determination apparatus 10 differs from those of the first to third embodiments in that the recognition unit 26 and a sensor decision unit 28 are included. Another difference from the first to third embodiments is that the storage 13 realizes the function of a reliability storage unit 32.
Description of Operation Referring to FIGS. 17 and 18, operation of the fog determination apparatus 10 according to the fifth embodiment will be described.

The operation of the fog determination apparatus 10 according to the fifth embodiment corresponds to a fog determination method according to the fifth embodiment. The operation of the fog determination apparatus 10 according to the fifth embodiment also corresponds to processes of a fog determination program according to the fifth embodiment.

Figure 17:
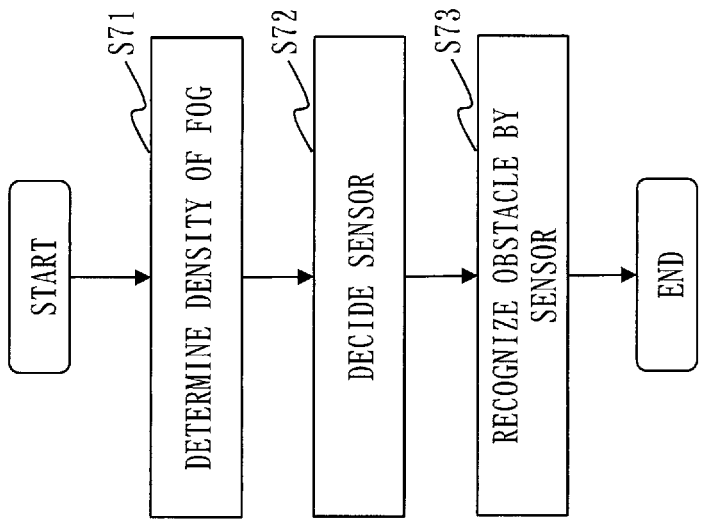
FIG. 17 is a flowchart illustrating overall operation of the fog determination apparatus 10 according to the fifth embodiment.

Referring to FIG. 17, the overall operation of the fog determination apparatus 10 according to the fifth embodiment will be described.

Step S71 is the process to determine the density of fog, described in the first to third embodiments.
(Step S72: Sensor Decision Process)

The sensor decision unit 28 decides the sensor to be used for identifying an obstacle depending on the density of fog determined in step S71.

Figure 18:
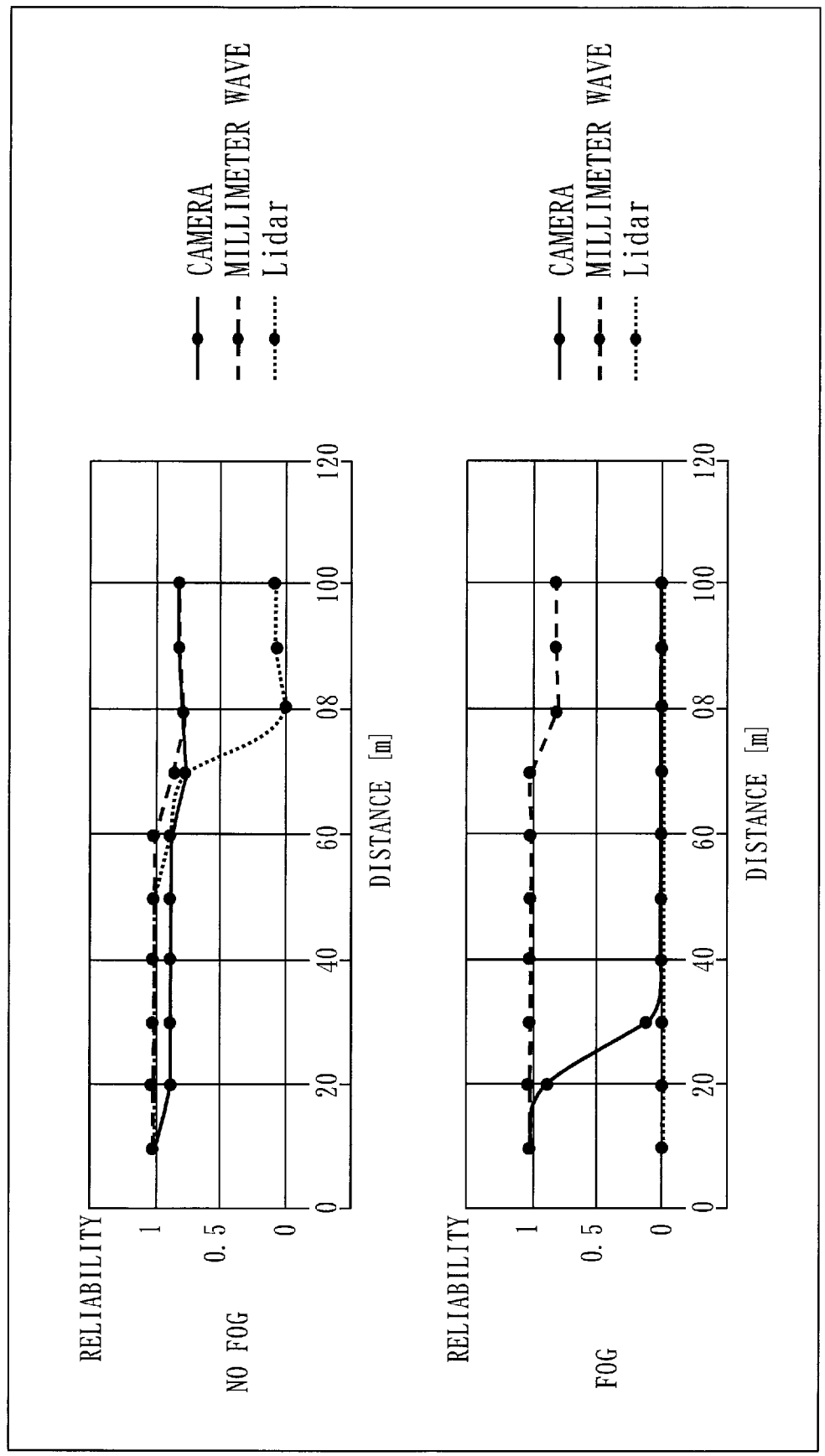
FIG. 18 is a diagram describing information to be stored in a reliability storage unit 32 according to the fifth embodiment.

Specifically, the reliability storage unit 32 stores reliabilities depending on the distance, separately for each density of fog and for each sensor mounted on the mobile object 100. As illustrated in FIG. 18, when a camera, a millimeter wave radar, and a LiDAR are mounted on the mobile object 100 as sensors, the reliability storage unit 32 stores reliabilities depending on the distance for each of the camera, the millimeter wave radar, and the LiDAR, separately for each density of fog. FIG. 18 illustrates reliabilities depending on the distance in a case in which fog is present and a case in which no fog is present. The reliabilities for each of the sensors are obtained empirically.

The sensor decision unit 28 refers to the reliability storage unit 32, and decides, as the sensor to be used for identifying an obstacle, a sensor having a high reliability in the case of the density of fog deter mined in step S71. The sensor decision unit 28 may decide the sensor to be used for identifying an obstacle separately for each length of the distance.

For example, the sensor decision unit 28 decides to use the LiDAR and the camera when no fog is present, and decides to use the millimeter wave radar and the camera when fog is present.

(Step S73: Recognition Process)

The recognition unit 26 recognizes an obstacle, using the sensor decided in step S72.

Effects of Fifth Embodiment

As described above, the fog determination apparatus 10 according to the fifth embodiment decides the sensor to be used for identifying an object depending on the density of fog. This allows an obstacle to be appropriately recognized.
Other Configuration
<Fourth Variation>

In the fifth embodiment, the function is added to the first to third embodiments. However, the function may also be added to the fourth embodiment.

Figure 16:
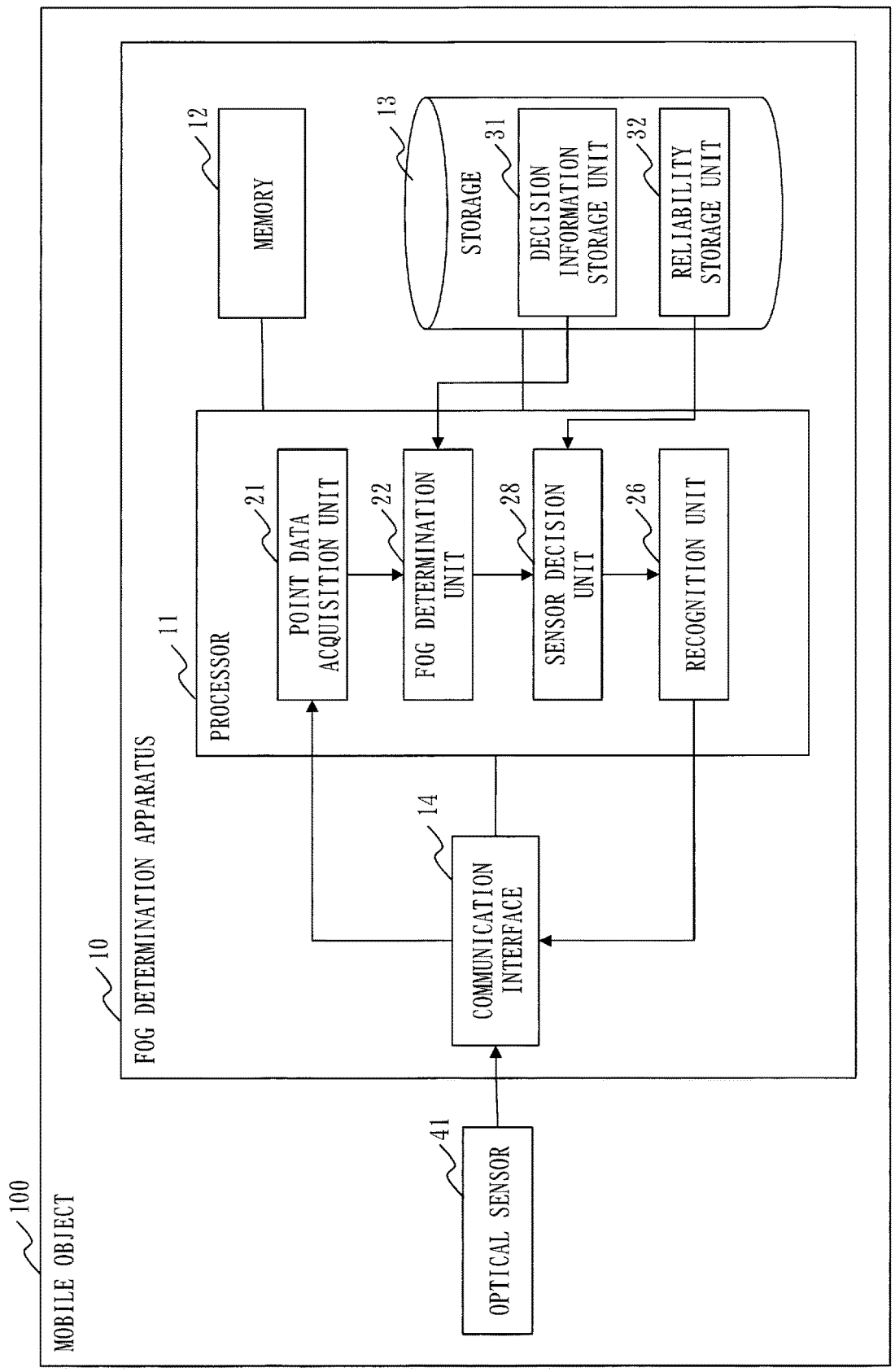
FIG. 16 is a configuration diagram of the fog determination apparatus 10 according to a fifth embodiment.
Figure 19:
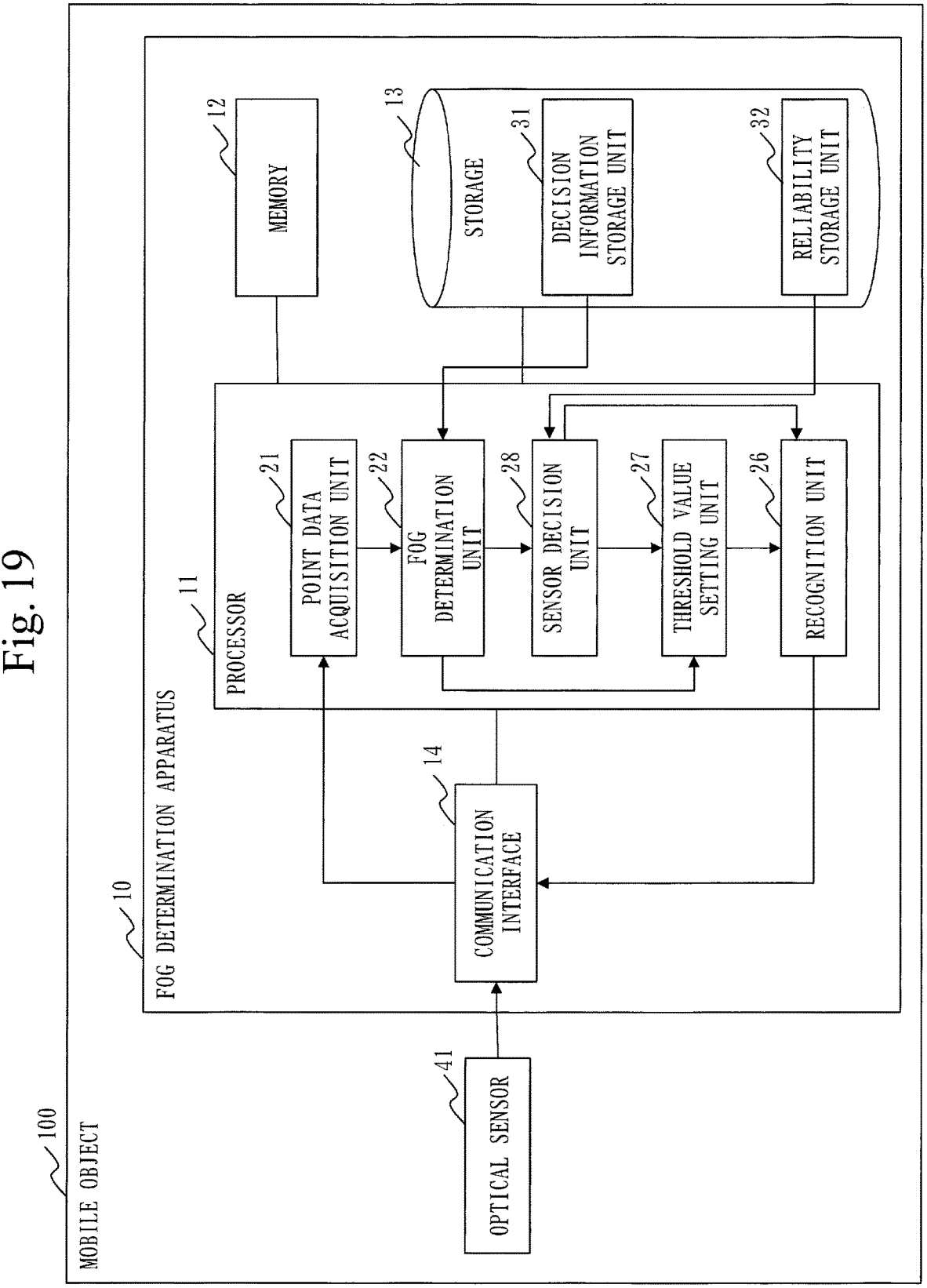
FIG. 19 is a configuration diagram of the fog determination apparatus 10 according to a fourth variation.
Figure 20:
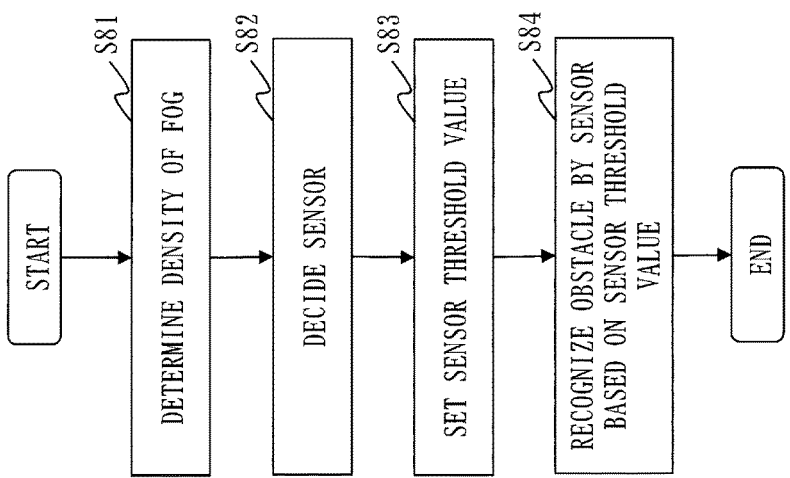
FIG. 20 is a flowchart illustrating overall operation of the fog determination apparatus 10 according to the fourth variation.

In this case, as illustrated in FIG. 19, the fog determination apparatus 10 includes the threshold value setting unit 27 in addition to the functional components illustrated in FIG. 16. As illustrated in FIG. 20, in step S82 the sensor decision unit 28 decides the sensor to be used, and then in step S83 the threshold value setting unit 27 decides the sensor threshold value for the decided sensor.

Note that the processes of steps S81, S82, and S84 are the same as the processes of steps S71, S72, and S73 in FIG. 17. Also note that the process of step S83 is the same as the process of step S62 in FIG. 14.

The embodiments and variations of the present invention have been described above. Any ones of these embodiments and variations may be implemented in combination. Alternatively, any one or ones of these embodiments and variations may be partially implemented. Note that the present invention is not limited to the above embodiments and variations, and various modifications can be made as necessary.

REFERENCE SIGNS LIST

10: fog determination apparatus, 11: processor, 12: memory, 13: storage, 14: communication interface, 15: electronic circuit, 21: point data acquisition unit, 22: fog determination unit, 23: first determination unit, 24: second determination unit, 25: overall determination unit, 26: recognition unit, 27: threshold value setting unit, 28: sensor decision unit, 31: decision information storage unit 32: reliability storage unit, 100: mobile object

The invention claimed is:

1. A fog determination apparatus comprising:
processing circuitry to:
acquire a set of point data indicating reflection points obtained by an optical sensor that receives reflected light of an emitted light beam reflected at the reflection points; and
determine a density of fog based on whether the reflection points are distributed in an arcuate shape around the optical sensor when the reflection points indicated by the point data included in the acquired set are seen in an overhead view, wherein
the processing circuitry
calculates a circle that is approximated by the reflection points when the reflection points indicated by the point data in the set are seen in an overhead view,
calculates a variance of a distance between the calculated circle and each of the reflection points, and
determines the density of the fog based on a result of comparing a threshold value of a variance for a density of fog to the calculated variance of the distance between the calculated circle and each of the reflection points.

2. The fog determination apparatus according to claim 1, wherein the processing circuitry calculates the circle that is approximated, using a least-squares method of a circle.

3. The fog determination apparatus according to claim 1, wherein the processing circuitry determines a greater density of fog as the variance is smaller.

4. The fog determination apparatus according to claim 1, wherein the processing circuitry acquires a set of point data, each piece of the point data in the set of point data indicating reflection points obtained by the optical sensor that receives reflected light of an emitted light beam reflected at the reflection points, and each piece of the point data being a pair of first point data indicating a first reflection point, which is a reflection point of a given light beam, and second point data indicating a second reflection point, which is a reflection point at which an intensity of reflected light of the given light beam is lower when compared with the first reflection point, determines a density of fog as a first density based on a distribution of distances between the first reflection points and the second reflection points concerning the point data included in the set, determines a density of fog as a second density based on the variance, and determines a density of fog based on the determined first density and the determined second density.

5. The fog determination apparatus according to claim 4, wherein the processing circuitry determines the first density by comparing a distribution pattern of distances corresponding to each density of fog with a distribution of the distances concerning the point data included in the set.

6. The fog determination apparatus according to claim 5, wherein the processing circuitry determines the first density by comparing a histogram pattern of frequencies of the distances corresponding to each density of fog with a histogram of frequencies of the distances concerning the point data included in the set.

7. The fog determination apparatus according to claim 1, wherein the processing circuitry sets a sensor threshold value of a sensor for identifying an obstacle, depending on the determined density of fog.

8. The fog determination apparatus according to claim 1, wherein the processing circuitry decides a sensor to be used for identifying an obstacle, depending on the determined density of fog.

9. A fog determination method comprising:
acquiring a set of point data indicating reflection points obtained by an optical sensor that receives reflected light of an emitted light beam reflected at the reflection points; and determining a density of fog based on whether the reflection points are distributed in an arcuate shape around the optical sensor when the reflection points indicated by the point data included in the acquired set are seen in an overhead view, wherein determining the density of fog further comprises:
calculating a circle that is approximated by the reflection points when the reflection points indicated by the point data in the set are seen in an overhead view,
calculating a variance of a distance between the calculated circle and each of the reflection points, and
determining the density of the fog based on a result of comparing a threshold value of a variance for a density of fog to the calculated variance of the distance between the calculated circle and each of the reflection points.

10. A non-transitory computer readable medium storing a fog determination program for causing a computer to execute:
a point data acquisition process to acquire a set of point data indicating reflection points obtained by an optical sensor that receives reflected light of an emitted light beam reflected at the reflection points; and a fog determination process to determine a density of fog based on whether the reflection points are distributed in an arcuate shape around the optical sensor when the reflection points indicated by the point data included in the set acquired by the point data acquisition process are seen in an overhead view, wherein the fog determination process comprises:
calculating a circle that is approximated by the reflection points when the reflection points indicated by the point data in the set are seen in an overhead view,
calculating a variance of a distance between the calculated circle and each of the reflection points, and
determining the density of the fog based on a result of comparing a threshold value of a variance for a density of fog to the calculated variance of the distance between the calculated circle and each of the reflection points.

* * * * *